G. I. STADEKER.
WIND SHIELD WIPER.
APPLICATION FILED JUNE 26, 1918.
1,326,145.
Patented Dec. 23, 1919.
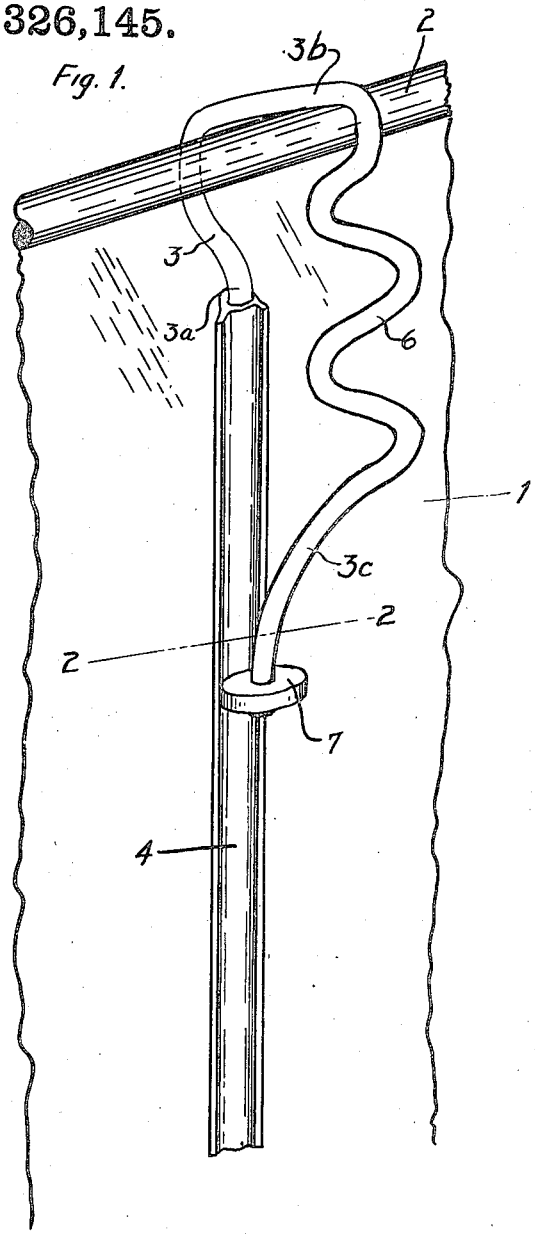
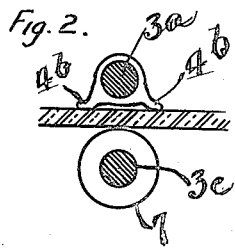
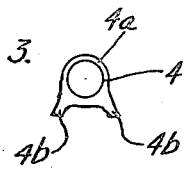
Gilbert I. Stadeker
INVENTOR.
BY
ATTORNEYS.

UNITED STATES PATENT OFFICE.

GILBERT I. STADEKER, OF CHICAGO, ILLINOIS.

WIND-SHIELD WIPER.

1,326,145.  Specification of Letters Patent.  Patented Dec. 23, 1919.

Application filed June 26, 1918. Serial No. 241,911.

*To all whom it may concern:*

Be it known that I, GILBERT I. STADEKER, a citizen of the United States, residing at Chicago, in the county of Cook and State of Illinois, have invented a certain new and useful Improvement in Wind-Shield Wipers, of which the following is a full, clear, concise, and exact description, reference being had to the accompanying drawings, forming a part of this specification.

My invention relates to wind shield wipers, especially adapted for use in connection with glass wind shields for automobiles.

The principal object of the invention is to provide a simple and practical form or construction of wind shield wiper, and especially to arrange for the wiper to be held squarely and firmly against the glass.

In the accompanying drawings Figure 1 is a perspective view of a wind shield wiper embodying my present invention applied to a wind shield of an automobile;

Fig. 2 is a cross section taken on line 2—2 in Fig. 1;

Fig. 3 is a view of a detail of construction.

Referring to Fig. 1, I show an automobile wind shield 1 of the usual form or construction, the same having a metal rod 2 extending along its top. Upon this is a wind shield wiper 3 constructed in accordance with my present invention. This wind shield wiper is preferably made of a rod of metal such as iron or steel bent so as to form the cleaning portion $3^a$, the overhead connecting portion $3^b$, and the handle portion $3^c$.

The cleaning portion $3^a$ is provided with a longitudinally extending member 4 which is preferably in tubular form and made of some good cleaning material, such for example, as rubber. It has a tubular body portion $4^a$ and two projecting portions $4^b$—$4^b$, which extend longitudinally of the body portion, preferably from end to end of the same. These projections or ribs $4^b$ are conveniently made integral with the body portion 4, the whole being formed as one integral cover or cleaning attachment to be mounted upon the member or limb $3^a$. These two ribs or projections $4^b$ preferably have a slight inclination, as shown in Fig. 3, and these extend toward the glass when the wiper is in normal position, as shown in Figs. 1 and 3. The device is so constructed that the members $3^a$ and $3^c$ are both pressed firmly against the opposite sides of the glass of the wind shield when the device is in position, and this causes the two ribs $4^b$ to be slightly bent or spread outwardly, as shown in Fig. 2. By grasping the handle $3^c$ the wind shield wiper may be swung from side to side and when this is done the two ribs $4^b$ will both act as cleaning members, thereby increasing the efficiency of the device by giving it two cleaning members instead of one. At the same time, the inclination of the ribs $4^b$ gives them a cutting effect, making them more effective in cleaning the wind shield. Furthermore, the wiper is held firmly against the glass and at right angles to the same so that it cannot wabble or twist. This construction also holds the wiper squarely in operative position without any auxiliary device.

The handle portion $3^c$ is preferably made of a plurality of zigzag bends 6 in accordance with the invention of my application Serial No. 207,447, filed December 17, 1917. Also a small roller or wheel 7 is desirably attached to the lower end of the member $3^c$ to permit the wiper to slide readily along the glass.

It will be understood that changes and modifications may be made without departing from the spirit of the invention.

What I claim is:

A wind shield wiper comprising a rod bent in substantially U-form to form handle and cleaning portions adapted to extend on opposite sides of the wind shield, and a tubular wiper member fitted over the cleaning portion of said rod and provided with a pair of longitudinally extending separated oppositely disposed projecting ribs integral therewith and adapted to engage and wipe the shield.

In witness whereof, I hereunto subscribe my name this 27th day of May A. D., 1918.

GILBERT I. STADEKER.